(12) United States Patent
Ashbaugh

(10) Patent No.: US 9,811,334 B2
(45) Date of Patent: Nov. 7, 2017

(54) BLOCK OPERATION BASED ACCELERATION

(71) Applicant: Intel Corporation, Santa Clara, CA (US)

(72) Inventor: Ben Ashbaugh, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/099,215

(22) Filed: Dec. 6, 2013

(65) Prior Publication Data

US 2015/0161758 A1   Jun. 11, 2015

(51) Int. Cl.
| G06T 1/60 | (2006.01) |
| G06F 13/00 | (2006.01) |
| G06F 9/30 | (2006.01) |
| G06F 12/00 | (2006.01) |
| G06T 1/20 | (2006.01) |

(52) U.S. Cl.
CPC .............. *G06F 9/30* (2013.01); *G06F 12/00* (2013.01); *G06T 1/20* (2013.01); *G06T 1/60* (2013.01)

(58) Field of Classification Search
None
See application file for complete search history.

(56) References Cited

U.S. PATENT DOCUMENTS

| 5,812,147 A * | 9/1998 | Van Hook | G06F 9/30032 |
| | | | 345/522 |
| 8,400,458 B2 * | 3/2013 | Wu | G06F 15/8023 |
| | | | 345/501 |
| 2003/0011609 A1 * | 1/2003 | Deering | G06F 3/14 |
| | | | 345/582 |
| 2003/0200378 A1 * | 10/2003 | Kirsch | G06F 9/30141 |
| | | | 711/1 |
| 2004/0255102 A1 * | 12/2004 | Dijkstra | G06F 9/30043 |
| | | | 712/225 |
| 2011/0211036 A1 * | 9/2011 | Tran | H04N 5/23229 |
| | | | 348/14.08 |
| 2012/0060015 A1 * | 3/2012 | Eichenberger | G06F 15/8069 |
| | | | 712/4 |
| 2014/0037228 A1 * | 2/2014 | Lefebvre | G01R 33/5608 |
| | | | 382/304 |
| 2014/0176588 A1 * | 6/2014 | Duluk, Jr. | G09G 5/001 |
| | | | 345/541 |

* cited by examiner

*Primary Examiner* — Jacinta M Crawford
(74) *Attorney, Agent, or Firm* — Jordan IP Law, LLC

(57) ABSTRACT

Apparatuses, systems, and methods may implement a block operation on a data block. The block operation may include a data transfer event involving system memory to be performed by an element block independently of shared local memory. The block operation may also include a data transfer event involving system memory to be performed by the element block using one memory address for the element block. In addition, the block operation may include a data transfer event including a data register and/or excluding shared local memory to be performed by the element block. The block operation may include a data transfer event involving one or more rows of data. The width of the data block may be implicitly defined, based on the number of elements in the element block. In one example, the block operation may be implemented for a scalar, or single instruction multiple thread program as a built-in function.

21 Claims, 6 Drawing Sheets

BLOCK OPERATION BASED ACCELERATION

BACKGROUND

Consumer electronics platforms such as smart televisions (TVs), laptops, tablets, cell phones, gaming consoles, etc., may include hardware to render graphics and/or perform parallel computation tasks. Known frameworks that provide a top-level abstraction for hardware as well as memory and execution models to deal with parallel code execution may be scalar or single instruction multiple thread (SIMT) frameworks. For example, SIMT shader programs that break a problem into work performed in parallel by independent work items (or threads) may require access to shared memory (e.g., shared local memory, thread group shared memory, etc.) when the work items need to cooperate to compute a result. Hardware computing power and/or hardware performance may suffer since, for example, a load operation and/or a store operation involving shared local memory may be relatively inefficient.

Additionally, shared local memory may add complexity to programming frameworks. For example, Open Computing Language (or OpenCL, a trademark of Khronos Group) SIMT shader programs may include an async work group built-in function that requires a source and a destination to be explicitly defined, synchronization events to ensure safe read or overwrite of the shared local memory, and so on. In addition, SIMT programs may require that each work item in a sub-group (or thread in a warp) have its own memory address to access data for a load operation, a store operation, and so on. Moreover, SIMT application programming interfaces (APIs), which allow SIMT work items to share data using a shuffle built-in function, only apply to rearranging data in a register and not to operations involving, for example, data transfer.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
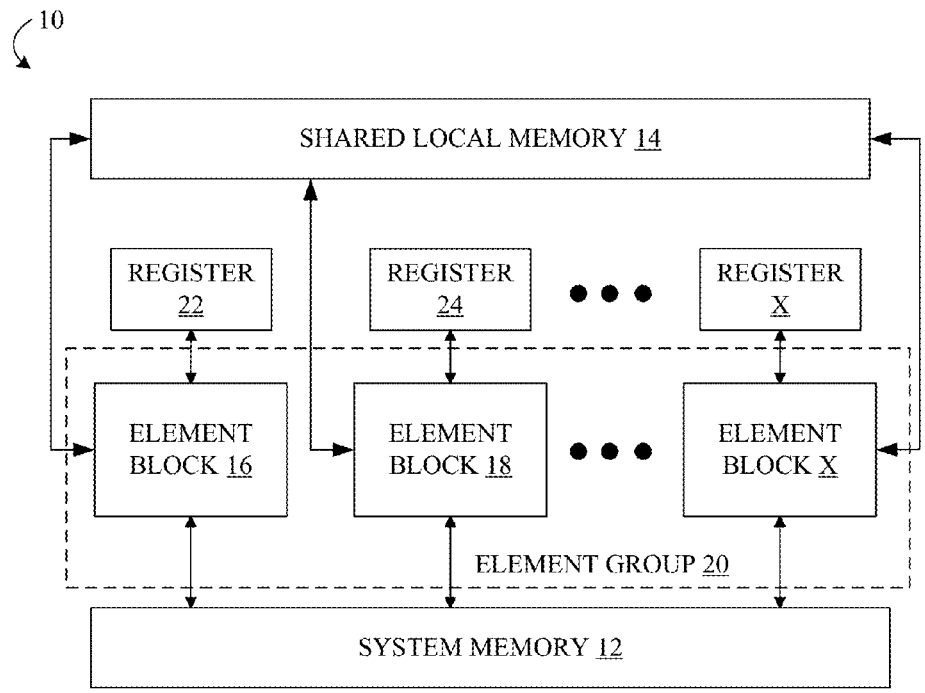
FIG. 1A is a block diagram of an example of a block operation apparatus according to an embodiment.

FIG. 1A shows a block operation apparatus 10 according to an embodiment. The illustrated apparatus 10 may include any computing platform such as a laptop, personal digital assistant (PDA), wireless smart phone, media content player, imaging device, mobile Internet device (MID), server, gaming console, wearable computer, any smart device such as a smart phone, smart tablet, smart TV, and so on, or any combination thereof. The apparatus 10 may include one or more processors, such as a central processing unit (CPU), a graphical processing unit (GPU), a visual processing unit (VPU), and so on, or combinations thereof. For example, the apparatus 10 may include one or more hosts (e.g., CPU, etc.) to control one or more compute devices (e.g., CPU, GPU, etc.), wherein each compute device may include one or more compute units (e.g., cores, single instruction multiple data units, etc.) having one or more execution elements to execute functions, described below.

The illustrated apparatus 10 includes a system memory 12, which may be external and coupled to one or more of the processors by, for example, a memory bus. The system memory 12 may also be integral to one or more of the processors, for example on-chip. The system memory 12 may include volatile memory, non-volatile memory, and so on, or combinations thereof. For example, the system memory 12 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory, or PROM, erasable PROM, or EPROM, electrically EPROM, or EEPROM, etc.), phase change memory (PCM), and so on, or combinations thereof. The system memory 12 may include an array of memory cells arranged in rows and columns, partitioned into independently addressable storage locations. Thus, access to the system memory 12 may involve using a memory address including, for example, a row address identifying the row containing the storage memory location and a column address identifying the column containing the storage memory location.

The system memory 12 may reside at a different physical level and/or access level of a memory hierarchy relative to a shared local memory 14 of the apparatus 10. For example, the system memory 12 may include main memory, global memory, etc., when the shared local memory 14 includes a relatively lower-latency memory physically nearer to one or more of the processors (e.g., an L1 cache). In addition, data such as, for example, graphics data (e.g., a tile of an image, etc.) may be transferred from the system memory 12 to the shared local memory 14 to provide relatively faster access to the data. For example, a problem may be partitioned into work to be performed in parallel by two or more execution elements (e.g, work items, threads, etc.), wherein the two or more execution elements may be grouped together into one or more element blocks 16, 18, . . . X (e.g., sub-group, warp, etc.) of an element group 20 (e.g., work group, thread block, etc.). Thus, a processor may create, schedule, and/or execute the element blocks 16, 18, . . . X when the processor is given the element group 20, wherein the shared local memory 14 may be visible to all of the execution elements of the element group 20 with the same lifetime as the element group 20 to provide relatively faster access to the data.

The apparatus 10 may also include one or more registers, such as an address register for address data (e.g, memory address, etc.), an instruction register for instruction data (e.g., X86 instruction, etc.), and so on, or combinations thereof. In the illustrated example, the apparatus 10 includes one or more data registers 22, 24, . . . X, which may be dynamically assigned to one or more element blocks. For example, the data register 22 may be assigned to the element block 16, the data register 24 may be assigned to the element block 18, and so on. In addition, the data registers 22, 24, . . . X may include hardware data registers, of any size. For example, the data registers 22, 24, . . . X may each include a single instruction multiple data (SIMD) hardware register which is 256 bits wide, 512 bits wide, and so on. The data registers 22, 24, . . . X may hold any data for a data-parallel computation. For example, the data registers 22, 24, . . . X may hold signal processing data, simulation data, finance computational data, chemical/biological computational data, and so on, or combinations thereof. A display, such as a liquid crystal display (LCD), a light emitting diode (LED) display, a touch screen, etc., may render the data. For example, the data may be rendered in a spreadsheet format, a text format (e.g., Rich Text, etc.), a markup language format (e.g., Hypertext Markup Language, Extensible Markup Language, etc.), and so on, or combinations thereof.

The data registers 22, 24, . . . X may also hold graphics data for image and/or media (e.g., video, etc.) processing applications such as, for example, one-dimensional (1D) rendering, two-dimensional (2D) rendering, three-dimensional (3D) rendering, post-processing of rendered images, video codec operations, image scaling, stereo vision, pattern recognition, and so on, or combinations thereof. In one example, the data registers 22, 24, . . . X may hold pixel data, vertex data, texture data, and so on, or combinations thereof. The data registers 22, 24, . . . X may also hold data to be utilized by a shader program such as, for example, a single instruction multiple thread (SIMT) shader, a vertex shader, a geometry shader, a pixel shader, a unified shader, and so on, or combinations thereof. The shader program may utilize the data in the data registers 22, 24, . . . X for variety of operations involving, for example, hue, saturation, brightness, contrast, blur, bokeh, shading, posterization, bump mapping, distortion, chroma keying, edge detection, motion detection, and so on, or combinations thereof. A display, such as an LCD, an LED display, a touch screen, etc., may render the graphics data. For example, the graphics data may be rendered in an image format (e.g., joint photographic experts group (JPEG) data, etc.), in a video format (e.g., moving picture experts group (MPEG) data, etc.), and so on, or combinations thereof.

The apparatus 10 may implement one or more built-ins to cause the element blocks 16, 18, . . . X to perform one or more block operations. For example, the block operations may include a load operation, a store operation, a transform operation, a motion estimation operation, a feature extraction operation, and so on, or combinations thereof. In one example, the block operation may include a data transfer event involving the system memory 12 to be performed by the element blocks 16, 18, . . . X independently (e.g., without, excluding, bypassing, etc.) of the shared local memory 14. In another example, the block operation may include a data transfer event involving the system memory 12 to be performed by the element blocks 16, 18, . . . X using one memory address. In a further example, the block operation may include a data transfer event involving one or more of the data registers 22, 24, . . . X (e.g., transfer of a data block into and/or out of a data register, etc.).

A display may render data based on a block operation such as, for example, signal processing data, simulation data, finance computational data, chemical/biological computational data, graphics data, and so on, or combinations thereof. The data may be rendered utilizing, for example, the system memory 12, the shared local memory 14, the data registers 22, 24, . . . X, and so on, of combinations thereof. In one example, data based on a block transfer operation may include graphics tile data (e.g., a tile of an image), which may be rendered by the display. In another example, data based on a transform operation (e.g., convolution) may include graphics convolution data (e.g., filtered data), which may be rendered by the display. In a further example, data based on a feature extraction operation (e.g., pass in an image and a coordinate and return a coordinate where a feature is located in the image) may include feature data (e.g., the feature), which may be rendered by the display. Thus, data based on the block operation and rendered by the display may include, for example, data transferred to and/or from memory, data transferred to and/or from a register, data processed and loaded and/or stored, data obtained using a result (e.g., a feature obtained using a coordinate), and so on, or combinations thereof.

The apparatus 10 may also implement other operations such as, for example, sharing the data in the data registers 22, 24, . . . X. For example, one or more built-ins may be used to cause the execution elements in the element block 16 to share the data in the register 22, to cause the execution elements in the element block 18 to share the data in the register 24, and so on, or combinations thereof. In particular, known general purpose graphical processing unit (GPGPU) application programming interfaces (APIs) may allow scalar, or SIMT programs, to share data among work items (or threads) without using local memory. In one example, a Compute Unified Device Architecture (or CUDA, a trademark of NVIDIA Corporation) programming language may allow a thread running as part of the same warp to share data via a shuffle (e.g., _shfl( ) family of built-ins. In another example, OpenCL, 2.0 (OpenCL is a trademark of Khronos Group) may include built-ins to synchronize work items running in the same sub-group. Thus, for example, an SIMD built-in for the scalar, or SIMT program, may be invoked to cause a block of data to be transferred to and/or from the system memory 12, the registers 22, 24, . . . X, and so on, wherein the SIMT built-in may be invoked to cause execution elements in an element block to share data in a data register 22, to cause the execution elements in the element block 18 to share the data in the register 24, and so on, or combinations thereof.

Figure 1B:
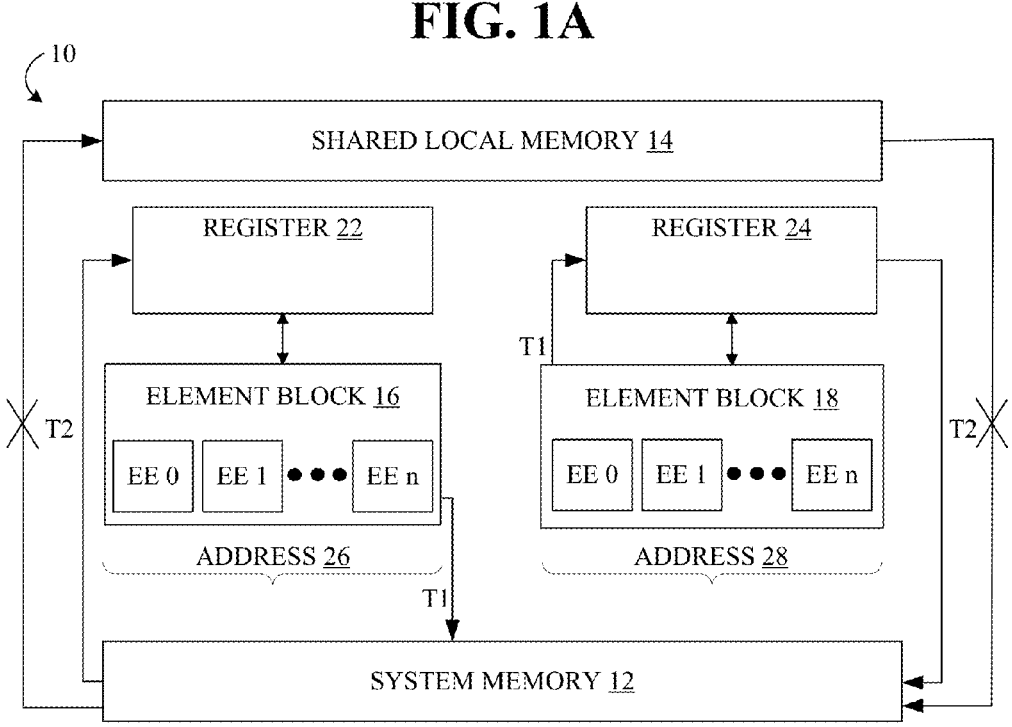
FIG. 1B is a block diagram of an example of a flow of a block operation by a block operation apparatus according to an embodiment.

Turning now to FIG. 1B, an example of a flow of a block operation by the apparatus 10 is shown according to an embodiment. In the illustrated example, each of the element blocks 16, 18 include corresponding execution elements EE 0, EE 1, . . . EE n, which may execute in parallel to perform an operation (e.g., a function, etc.). The execution elements EE 0, EE 1, . . . EE n may be defined by a scalar module such as, for example, a scalar program (e.g., a SIMT shader program, etc.) and grouped into respective the element blocks 16, 18 to be executed by a compute device (e.g., a processor, etc.). The apparatus 10 may also include a block module to be invoked by the scalar module and to implement a block operation on a data block. The block module may include an instruction, which may cause the element block 16 to perform a load block operation including a data transfer event involving the system memory 12 independently of the shared local memory 14, such as:

```
//"Load"
gentype intel_simd_block_read (
    _global gentype *p)
```

The illustrated SIMD built-in instruction (e.g., argument intel_simd_block_read) does not require the shared local memory 14. In particular, the illustrated block operation includes a data transfer event including the data register 22 and excluding shared local memory 14. In the illustrated example, the load block operation includes a load of the data block by the element block 16 from the system memory 12 directly to the data register 22. For example, the element block 16 accesses the system memory 12 at time T1 using one memory address 26 (e.g., argument *p) to obtain the data block, and transfers the data block to the register 22 at time T2. Of note, the memory address may depend on the context, and/or includes a pointer for a memory buffer (e.g., a memory buffer address including a row/column address), a memory coordinate address for an image (e.g., an x,y Cartesian coordinate for a 2D image, etc.), and so on. Thus, there may be one address for the entire data block instead of requiring one address per execution element EE 0, EE 1, . . . EE n of the element block 16.

In another example, the block module may include an instruction, which may cause the element block 18 to perform a store block operation including a data transfer event involving the system memory 12 independently of the shared local memory 14, such as:

```
//"Store"
gentype intel_simd_block_write (
    _global gentype *p,
    gentype data)
```

The illustrated SIMD built-in instruction (e.g., argument intel_simd_block_write) does not require the shared local memory 14. In particular, the illustrated block operation includes a data transfer event including the data register 24 and excluding shared local memory 14. In the illustrated example, the store block operation includes a store of the data block by the element block 18 from the register 24 directly to the system memory 12. For example, the element block 18 accesses the register 24 at time T1 to obtain the data block, and transfers the data block to the system memory 12 at time T2 using one memory address 28 (e.g., argument *p) to store the data block. Of note, the memory address may depend on the context, and/or includes a pointer for a memory buffer (e.g., a memory buffer address including a row/column address), a memory coordinate address for an image (e.g., an x,y coordinate for a 2D image, etc.), and so on. Thus, there may be one address for the entire data block instead of requiring one address per execution element EE 0, EE 1, . . . EE n of the element block 18.

The load block operation and/or the store block operation may execute with relatively high performance since, for example, the registers 22, 24 are used and/or since the shared local memory 14 is bypassed in the block operations. In addition, performance may be improved since no synchronization is required. Moreover, performance degradation associated with requiring an execution element to have and pass its own memory address may be reduced. For example, all processing elements (e.g., work items, threads, etc.) performing known load or a store operations may be required to pass their own individual address. Since one memory address 26, 28 may be utilized for the entire element blocks 16, 18, respectively, the element block 16 may perform the load block operation and the element block 18 may perform the store block operation.

Additionally, the amount of data which is to be loaded (e.g., read out of system memory, written to a register, etc.) or stored (e.g., read out of a register, written to system memory, etc.) may be implicitly defined. For example, a known built-in function may require that the size of the data be explicitly defined (e.g., argument size_t num_gentypes in an async_work_group copy built-in, etc.). The width of the data block may be implicitly defined, however, by the number of execution elements that are running as part of the element blocks 16, 18. Thus, given an element block size of 8 or 16 execution elements for example, the first execution element EE 0 in the element block 16 may obtain a first element of data in the data block from the system memory 12 which may be n-bits wide (e.g., 32, etc.), the second element EE 2 may obtain a second element of the data in the data block from the system memory 12 which is n-bits wide (e.g., 32 bits, etc.), and so on, such that the data block size may be implicitly and/or dynamically defined to be 256 bits wide for 8 execution elements, 512 bits wide for 16 execution elements, and so on. Similarly, the width of the data block may be implicitly and/or dynamically defined by the number of execution elements that are running as part of the element block 18 for a store block operation, wherein the first execution element EE 0 in the element blocks 18 may obtain a first element of data in the data block from the register 22 which may be n-bits wide (e.g., 32, etc.), and so on.

Additionally, at least the destination of the data block may be implicitly defined, which may reduce complexity of the scalar framework. For example, a known built-in function may require copying data from global memory (e.g., argument local gentype *src in an async_work_group_copy built-in, etc.) to a destination (e.g., argument_local gentype *dst in an async_work_group_copy built-in, etc.). The destination of the data block for the load block operation, however, may be implicitly defined by the block since, for example, the register 22 may be assigned to the element block 16 wherein a part of the register 22 may be allocated to the execution element EE 0 of the element block 16, a next (or second) part of the register 22 may be assigned a next (or second) execution element EE 1, and so on. Thus, the element block 16 may load the data block into the single hardware register 22 without the need to explicitly define the destination of the data block in the load block operation. Similarly, the source of the data block for the store block operation may be implicitly defined since, for example, the execution elements EE 0, EE 1, . . . EE n of the element block 18 obtain an element of data out of the assigned register 18. Thus, the SIMD built-in functions allow each execution element to simply load and/or copy its corresponding data to and/or from assigned registers rather than needing explicit local memory as in known scalar, or SIMT built-in functions.

It should be understood that a block operation may be performed independently, in any order, in parallel, in series, and so on, or combinations thereof. In addition, it should be understood that one or more element groups 20 may be scheduled and/or executed in any order across any number of cores, allowing programs to be written which scale with, for example, the number of cores. Moreover, it should be understood that a block operation may be as relatively simple as loading a data block to facilitate the sharing of the loaded data block (e.g., via shfl( ) built-ins, etc.) without requiring shared local memory, may be relatively complex as estimating motion to determine where two or more images are moving, convolution, and/or any other type of image and/or video analytics. A block operation may also include a memory operation, a data block transfer operation, a data block processing operation, and so on, or combinations thereof. For example, a block operation may include moving blocks of data using one address (and/or one memory access event), moving blocks of data into and/or out of system memory, moving blocks of data into and/or out of a register, processing blocks of data and/or moving a result into or out of memory, a register, and so on, or combinations thereof.

Additionally, the apparatus 10 may include further components such as, for example, a power source (e.g., battery) to supply power to the apparatus 10, storage such as hard drive, a display (e.g., a touch screen, an LED display, an LCD display, etc.), and so on, or combinations thereof. In another example, the apparatus 10 may include a network interface component to provide communication functionality for a wide variety of purposes, such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning Systems (GPS), spread spectrum (e.g., 900 MHz), and other radio frequency (RF) telephony purposes.

Some embodiments may provide an SIMD block built-in function that may be invoked by a scalar, or SIMT shader program, and that does not require shared local memory. Thus, for example, block operations may be used within SIMT programming languages without requiring the use of shared local memory. In addition, some embodiments may provide an SIMD media block operation that includes reading from and/or writing to an image (e.g., a 2D image) at specified coordinates. A block operation may be as simple as a block memory access, wherein a block of data is transferred from memory to each SIMT work-item, to a complex media operation such as video motion estimation (VME) or two-dimensional (2D) convolution. Moreover, a block operation may utilize and/or be implemented in fixed function hardware in, for example, a graphical processing unit (GPU) that has improved performance and/or power performance relative to non-block operations. Thus, for example, interleaving SIMD block operations with standard SIMT instructions may provide additional processing benefit.

Figure 2A:
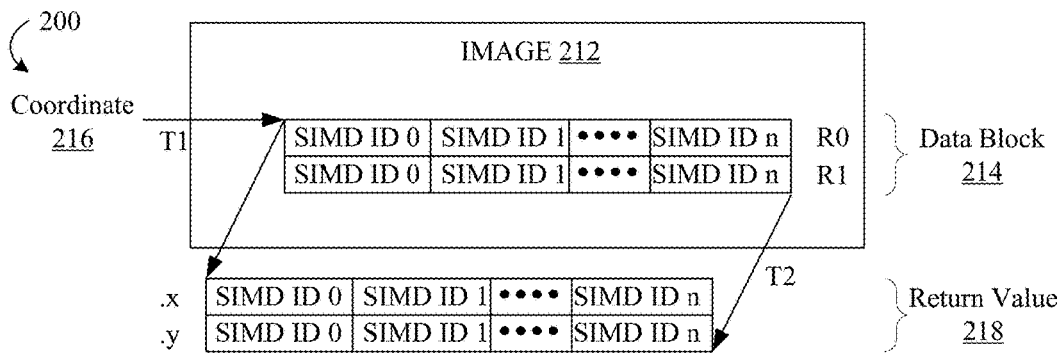
FIG. 2A is a block diagram of an example of a media block load operation according to an embodiment.

FIG. 2A to FIG. 2D illustrate block diagrams of example block operations according to an embodiment. FIG. 2A shows a block diagram of an example media block load operation 200 according to an embodiment. In one example, an element block may perform the media block load operation 200 in response to an instruction such as, for example:

```
//2-Row "Load"
uint2 intel_ simd_media_block_read (
  image2d_t image, int2 coord)
```

The illustrated SIMD built-in instruction (e.g., argument simd_media_block_read) may not require shared local memory. In particular, the illustrated block operation may include a data transfer event including a data register and excluding shared local memory. In the illustrated example, the media block load operation 200 includes a load of a data block 214 of an image 212 (e.g., argument image2d_t image), which may reside in memory such as, for example, system memory. The media block load operation 200 may be performed by an element block including two or more execution elements SIMD ID 0, SIMD ID 1. . . , SIMD ID n, wherein n may indicate the total number of execution elements in the element block. Accordingly, n may equal thirty-one when the element block includes thirty-two execution elements.

The media block load operation 200 may involve, for example, directly transferring the data block 214 from the image 212 to a data register. For example, the element block may access the data block 214 using one memory coordinate address 216 (e.g., argument int2 coord) at time T1. The memory coordinate address 216 may include, for example, a two-dimensional position in the image 212 which is some distance (e.g., approximately one-half) in one coordinate (e.g., y coordinate, etc.) and some distance (e.g., approximately one-fifth) in another coordinate (e.g., x coordinate, etc.) of a 2D image. The image 212 may include, however, data in more or less dimensions such as, for example, a 3D image wherein an additional dimension may be defined in the memory coordinate address 216 (e.g., z coordinate, etc.). In addition, there may be one memory coordinate address 216 for the entire data block 214 instead of requiring one address per execution element SIMD ID 0, SIMD ID 1. . . , SIMD ID n of the element block.

The data in the data block 214 may be returned as a return value 218 and loaded to the register at time T2, which may be shared by the execution elements SIMD ID 0, SIMD ID 1. . . , SIMD ID n to compute a result. For example, the execution elements SIMD ID 0, SIMD ID 1. . . , SIMD ID n may share the data using a shuffle operation. Thus, the media block load operation 200 may be performed once by the entire element block, and/or the data may be extracted from the image 212 and placed in the register unchanged. In addition, the media block load operation 200 may include a data transfer event involving one or more rows of data (e.g., 2 Row "Load") at one time. For example, the data block 216 may include data at row R0 and at row R1. Thus, the return value 218 may include 2 uint worth of data (e.g., uint2 argument) wherein each execution element SIMD ID 0, SIMD ID 1. . . , SIMD ID n may return one piece of data from R0 (e.g., in the .x channel) and one piece of data from R1 (e.g., in the .y channel).

Additionally, the amount of data to be loaded (e.g., read out of an image, written to a register, etc.) may be implicitly defined. For example, the return type in the illustrated example is a uint 2 (e.g., a uint may indicate a vector of n 32-bits unsigned integer values), and therefore the size of data may include 32 bits of data for each uint. In addition, the width of the data block 216 may be implicitly based on the number of execution elements SIMD ID 0, SIMD ID 1. . . , SIMD ID n in the element block which are to be processed in parallel. Thus, the amount of data may be implicitly and/or dynamically defined by the return type and the number of execution elements in the element block. Moreover, at least the destination of the data block 214 may be implicitly defined, which may reduce complexity of the scalar framework.

Figure 2B:
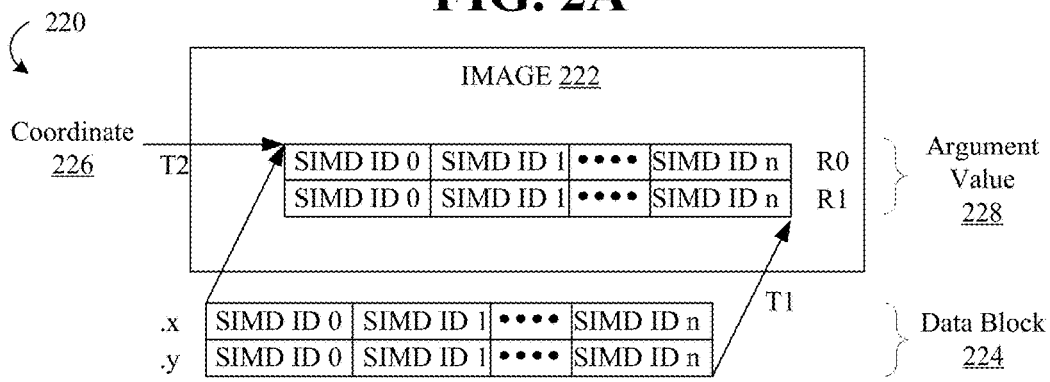
FIG. 2B is a block diagram of an example of a media block store operation according to an embodiment.

FIG. 2B shows a block diagram of an example of a media block store operation 220 according to an embodiment. In one example, the element block may perform the media block store operation 220 in response to an instruction such as, for example:

```
//2-Row "Store"
void intel_simd_media_block_write (
    image2d_t image, int2 coord,
    uint 2 data)
```

The illustrated SIMD built-in instruction (e.g., argument simd_media_block_write) may not require shared local memory. In particular, the illustrated block operation may include a data transfer event including a data register and excluding shared local memory. In the illustrated example, the media block store operation 220 includes a store of a data block 224 of a register to an image 222 (e.g., argument image2d_t image), which may reside in memory such as, for example, system memory. The media block store operation 220 may be performed by an element block including two or more execution elements SIMD ID 0, SIMD ID 1. . . , SIMD ID n, wherein n may indicate the total number of execution elements in the element block. Accordingly, n may equal to thirty-one when the element block includes thirty-two execution elements.

The media block store operation 220 may involve, for example, directly transferring the data block 224 from the data register to the image 222. For example, the element block may access the data block 224 in the register at time T1 and pass the data as a function argument value 228 to store the data in the image 222 using one memory coordinate address 226 (e.g., argument int2 coord) at time T2. The memory coordinate address 226 may include, for example, a two-dimensional position in the image 222 which is some distance (e.g., approximately one-half) in one coordinate (e.g., y coordinate, etc.) and some distance (e.g., approximately one-fifth) in another coordinate (e.g., x coordinate, etc.) of a 2D image. The image 222 may include, however, data in more or less dimensions such as, for example, a 3D image wherein an additional dimension may be defined in the memory coordinate address 226 (e.g., z coordinate, etc.). In addition, there may be one memory coordinate address 226 instead of requiring one address per execution element SIMD ID 0, SIMD ID 1. . . , SIMD ID n of the element block.

The data in the data block 224 may be passed as the function argument value 228 and loaded to the register at time T2. Thus, the block operation 220 may be performed once by the entire element block, and/or the data may be extracted from the register and placed in the image 222 unchanged. In addition, the media block store operation 220 may include a data transfer event involving one or more rows of data (e.g., 2 Row "Store") at one time. For example, the data block 224 may include data from two rows. Thus, the function argument value 228 may include 2 uint worth of data (e.g., uint2 argument) wherein each execution element SIMD ID 0, SIMD ID 1. . . , SIMD ID n returns one piece of data to be stored at R0 (e.g., from the .x channel) and one piece to be stored at R1 (e.g., from the .y channel).

Additionally, the amount of data to be stored (e.g., read out of a register, written to an image, etc.) may be implicitly defined. For example, the return type in the illustrated example is a uint 2 (e.g., a uint n may indicate a vector of n 32-bits unsigned integer values), and therefore the size of data may include 32 bits of data for each uint. In addition, the width of the data block 216 may be implicitly defined based on the number of execution elements SIMD ID 0, SIMD ID 1. . . , SIMD ID n in the element block which are to be processed in parallel. Thus, the amount of data may be implicitly and/or dynamically defined by the return type and the number of execution elements in the element block. Moreover, at least the source of the data block 214 may be implicitly defined, which may reduce complexity of the scalar framework.

Figure 2C:
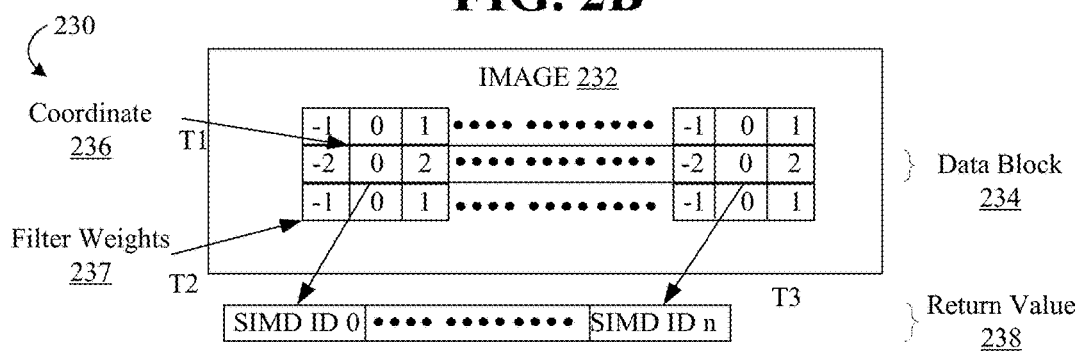
FIG. 2C is a block diagram of an example of a media block convolve operation according to an embodiment.

FIG. 2C shows a block diagram of an example of a media block convolve operation 230 according to an embodiment. In one example, an element block may perform the media block convolve operation 230 in response to an instruction such as, for example:

```
//2D Convolve
short intel_simd_convolve_2d (
    image2d_t image,
    convolve_accelerator_intel_t_a,
    float2 coord)
```

The illustrated SIMD built-in instruction (e.g., argument intel_simd_convolve_2d) may not require shared local memory. In particular, the illustrated block operation may include a data transfer event including a data register and excluding shared local memory. In the illustrated example, the media block convolve operation 230 includes a convolution of a data block 234 of an image 232 (e.g., argument image2d_t image), which may reside in memory such as, for example, system memory. The media block convolve operation 230 may be performed by an element block including two or more execution elements SIMD ID 0, SIMD ID 1. . . , SIMD ID n, wherein n may indicate the total number of execution elements in the element block. Accordingly, n may equal to thirty-one when the element block includes thirty-two execution elements.

The media block convolve operation 230 may involve, for example, directly transferring a result of the convolution operation (e.g., modified data) on the data block 234 of the image 232 to a data register. For example, the element block may access the image 232 using one memory coordinate address 236 (e.g., argument int2 coord) at time T1. The memory coordinate address 236 may include, for example, a two-dimensional position in the image 232 which is some distance (e.g., approximately one-half) in one coordinate (e.g., y coordinate, etc.) and some distance (e.g., approximately one-fifth) in another coordinate (e.g., x coordinate, etc.) of a 2D image. The image 232 may include, however, data in more or less dimensions such as, for example, a 3D image wherein an additional dimension may be defined in the memory coordinate address 236 (e.g., z coordinate, etc.). In addition, there may be one memory coordinate address 236 for the entire data block 234 instead of requiring one address per execution element SIMD ID 0, SIMD ID 1. . . , SIMD ID n of the element block.

There may be specialized hardware to process the data block 234 and generate modified data from the data block 234. For example, the media block convolve operation 230 may define a convolve accelerator (e.g., argument convolve_accelerator_intel_t a) to provide one or more filter weights 237 at time T2 to be applied to the data block 234. In the illustrated 3×3 convolution, the memory coordinate address 236 may point to the data block 234 (e.g., to the data of interest such as a block of pixels) and the element block may apply the filter weights 237 to surrounding data (e.g., surrounding pixels relative the data of interest) to generate the modified data from the raw data. Thus, each execution element SIMD ID 0, SIMD ID 1. . . , SIMD ID n may apply the filter weights 237 to corresponding neighbor data (e.g., relative to its corresponding data of interest) and return corresponding modified data in a return value 238 at one time.

The modified data from the data block 226 may be returned as the return value 238 and loaded to the register at time T3, which may be shared by the execution elements SIMD ID 0, SIMD ID 1..., SIMD ID n to compute a result. For example, the execution elements SIMD ID 0, SIMD ID 1..., SIMD ID n may share the data using one or more shuffle operations. Thus, the media block convolve operation 230 may be performed once by the entire element block, and/or the data may be extracted from the image 232 and placed in the register changed. In addition, the media block operation 230 may include a data transfer event involving one or more rows of data at one time. For example, an element block may perform a media block convolve operation in response to an instruction such as, for example:

```
//4-Row 2D Convolution
short intel_simd_convolve_2d (
    image2d_t image,
    convolve_accelerator_intel_t_a,
    float2 coord)
```

Thus, a data block may include data at four rows of an image such as, for example, the image 232 (e.g., 4 Row 2D Convolution) to be processed and/or modified by the element block in a multi-row media block convolution operation.

Additionally, the amount of data to be convolved may be implicitly defined. For example, the return type in the illustrated multi-row example is a short 4, wherein the numeral 4 may signify a 4-row version of the convolution operation with four times as much data needed compared to the illustrated one-row convolution, and wherein a short (e.g., a 16 bit integer) may be provided. Thus, the size of the data may include an unsigned integer four times a short (e.g., 64 bits of data) for the illustrated multi-row example. In addition, the width of the data block, such as the data block 226 for the one-row example, may be implicitly based on the number of execution elements SIMD ID 0, SIMD ID 1..., SIMD ID n in the element block which are to be processed in parallel. Thus, the amount of data may be implicitly and/or dynamically defined by the return type and the number of execution elements in the element block. Moreover, at least the destination of the data block, such as the data block 234, may be implicitly defined, which may reduce complexity of the scalar framework.

Figure 2D:
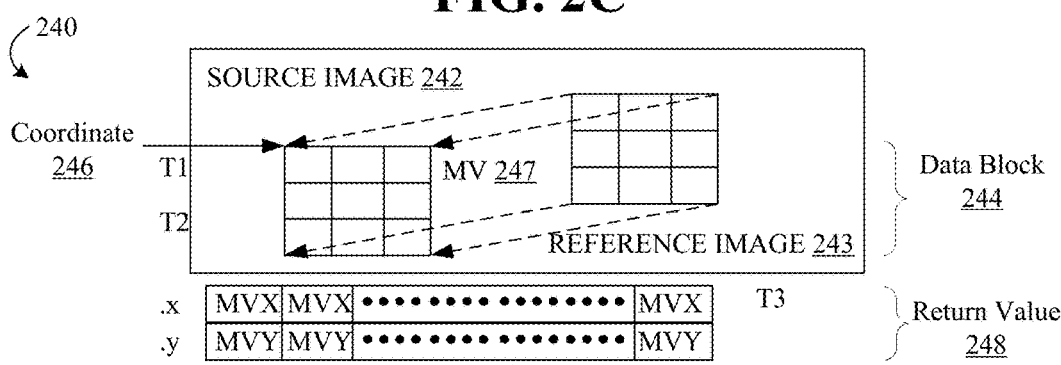
FIG. 2D is a block diagram of an example of a media block video motion estimation operation according to an embodiment.

FIG. 2D shows a block diagram of an example of a media block video motion estimation (VME) operation 240 according to an embodiment. In one example, an element block may perform the media block VME operation 240 in response to an instruction such as, for example:

```
//VME
short2 intel_simd_motion_estimation (
    read_only image2d_t src_image,
    read_only image2d_t ref_image,
    int2 coord)
```

The illustrated SIMD built-in instruction (e.g., argument intel_simd_motion_estimation) may not require shared local memory. In particular, the illustrated block operation may include a data transfer event including a data register and excluding shared local memory. In the illustrated example, the media block video motion estimation (VME) operation 240 includes a VME for a data block 244 of a source image 242 (e.g., argument image2d_t src_image), which may reside in memory such as, for example, system memory. The media block VME operation 240 may be performed by an element block including two or more execution elements (not shown).

The media block motion estimation operation 240 may involve, for example, directly transferring a motion vector 247 to a data register. For example, the element block may access the data block 244 using one memory coordinate address 246 (e.g., argument int2 coord) at time T1. The memory coordinate address 246 may include, for example, a two-dimensional position in the image which is some distance in one coordinate (e.g., y coordinate, etc.) and some distance in another coordinate (e.g., x coordinate, etc.) of a 2D image. The image 242 may include, however, data in more or less dimensions such as, for example, a 3D image wherein an additional dimension may be defined in the memory coordinate address 246. (e.g., z coordinate, etc.). In addition, there may be one memory coordinate address 246 for the entire data block 244 instead of requiring one address per execution element of the element block.

There may be specialized hardware to determine where the data block 244 of the source image 242 most closely matches a reference image 243 (e.g., argument image2d_t ref_image). For example, the media block VME operation 240 may compare (e.g., arguments read) the source image 242 with the reference image 243 to determine the motion vector 247 at time T2. The motion vector 247 may be returned as a return value 248 and loaded to the register at time T3, which may be shared by the execution elements to compute a result. For example, the motion vector 247 may be replicated across the entire register for each execution element since there may be one vector (e.g., 2D, 3D, etc.) which may indicate the match data for the data block 244. In the illustrated example, each execution element in the element block provides the MVX value and the MVY value (e.g., a 2D vector for a 2D image) to replicate the motion vector 237 across the register.

In another example, one execution element may provide the MVX value and the MVY value of the motion vector 247 to one location in the register as the return value 248, which may be accessible to each execution element in the element block using, for example, a shuffle operation. Remaining register locations (e.g., a location which does not have the MVX value and the MVY value) may be used for other operations, other data, etc., and/or may be filled with pre-determined values to indicate that the register includes data which may be of interest to the execution elements of the element block. Additionally, the amount of data which is to be loaded to the register may be implicitly and/or dynamically defined by the return type (e.g., argument short) and the number of execution elements in the element block to be processed in parallel, which may reduce complexity of the scalar framework. Moreover, at least the destination of the motion vector 247 may be implicitly defined, which may reduce complexity of the scalar framework.

Figure 3:
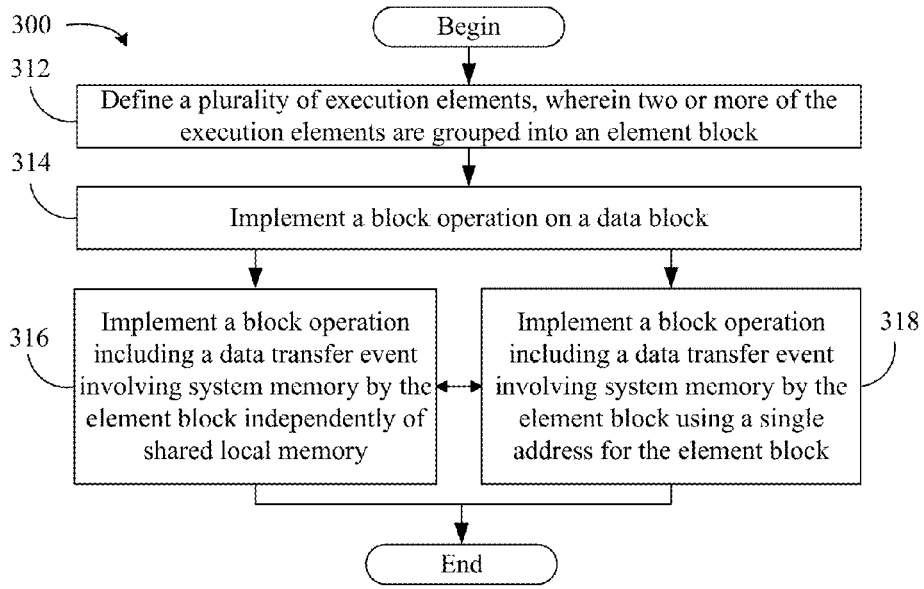
FIG. 3 is a flowchart of an example of a method of implementing a block operation according to an embodiment.

FIG. 3 shows a method 300 of implementing a block operation according to an embodiment. The method 300 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 300 may be written in any combination of one or more programming languages, including an object oriented programming language such as C++ or the like and conventional procedural programming languages, such as the "C" programming language or similar programming languages. Moreover, the method 300 may be implemented using any of the herein mentioned circuit technologies.

The illustrated processing block 312 defines a plurality of execution elements, wherein two or more of the execution elements are grouped into an element block. The element block may be defined by a scalar module such as, for example, a single instruction multiple thread (SIMT) module. In one example, the execution elements may be created as work items and grouped into a sub-group of a work group by an OpenCL module (OpenCL is a trademark of Khronos Group). In another example, the execution elements may be created as threads and grouped into a warp of a thread block by a CUDA module (CUDA is a trademark of NVIDIA Corporation). In addition, any other module may be implemented to manage and/or interface with work, execution elements, hardware, etc., such as, for example a DirectCompute module, OpenACC module, and so on, or combinations thereof.

The illustrated processing block 314 provides for implementing a block operation on a data block. The data block may include, for example, a block of signal processing data, simulation data, finance computational data, chemical/biological computational data, and so on, or combinations thereof. In addition, the data block may include a block of graphical data for image and/or media (e.g., video, etc.) processing applications such as, for example, one-dimensional (1D) rendering, two-dimensional (2D) rendering, three-dimensional (3D) rendering, post-processing of rendered images, video codec operations, image scaling, stereo vision, pattern recognition, and so on, or combinations thereof.

The block operation may include, for example, a load operation, a store operation, a transform operation, a motion estimation operation, a feature extraction operation, and so on, or combinations thereof. The load operation may include a load to a register, for example from memory (e.g, system memory), from an image (e.g., a 2D image, a 3D image, etc.), and so on, or combinations thereof. In addition, the store operation may include a store to memory (e.g., a memory buffer, etc.), to an image (e.g., a 2D image, a 3D image, etc.), and so on, or combinations thereof. In one example, reading from and/or writing to an image at specified coordinates may enable the use of tiling, fixed-functionality addressing hardware, and an ability to read multiple rows and/or write multiple rows of data to and/or from the image at once.

The transform operation may include, for example, a convolve operation, an erode operation, a dilate operation, a min filter operation, a max filter operation, and so on. In addition, the transform operation may include one output data for each input data in the data block. Thus, for example, each piece of data being operated on in the data block by an execution element in the transform operation may result in a corresponding output value of a result block value. The feature extraction operation may include, for example, a minmax operation, a centroid operation, a bool centroid operation, a bool sum operation, and so on, or combinations thereof. In addition, the feature extraction operation may include one output data independently of the number of data inputs from the data block. Thus, for example, each piece of data being operated on in the data block by an execution element in the feature extraction operation may result in one output value (e.g., coordinate) or multiple output values less than the number of input values no matter how many input values are in the data block. Similarly, the motion estimation operation may include one output data (e.g., one motion vector) independently of the number of data inputs (e.g., source image pixels or block size) since only one output value (e.g., vector) may be generated. Therefore, various media operation may operate on a different granularity than an SIMT work item.

The block operation may include a data transfer event involving one or more rows of data in a data block, a data processing event including one or more rows of data in a block of data, and so on, or combinations thereof. In one example, any load operation, store operation, transform operation, etc., may include one row-data transfer, four-row data transfer, and so on. In another example, any transform operation, motion estimation operation, etc., may include data modification such as, for example, one-row data processing, four-row data processing, and so on, or combinations thereof. In addition, the block operation may include a data processing event including a block of data which may be accessed, processed, and transferred into (and/or out of) memory, such as system memory, into (and/or out of) a register, such as a hardware register, and so on, or combinations thereof. The illustrated method 300 may proceed to processing blocks 316, 318, in any order. For example, the method 300 may proceed to the processing block 316 and then to the processing block 318, and/or vice versa. Moreover, the method 300 may proceed to the processing block 316 and end, and/or may proceed to the processing block 318 and end. Thus, the method 300 may proceed to the processing blocks 316, 318 sequentially, in parallel, and so on, or combinations thereof.

The illustrated processing block 316 provides for implementing a block operation on a data block, wherein the block operation includes a data transfer event involving system memory performed by the element block independently of shared local memory. For example, a single instruction multiple data (SIMD) module may include an instruction to cause an element block to perform a load block operation. The block load operation may include a load of the data block by the element block from memory (e.g., system memory) to a location other than shared local memory. In one example, the load operation includes a load of the data block by the element block from a system memory directly to a data register. In addition, the SIMD module may include an instruction to cause an element block to perform a store block operation. The store block operation may include a store of the data block by the element block from a location other than shared local memory to memory (e.g., system memory). In one example, the store operation includes a store of the data block by the element block from a data register directly to a system memory.

The load operation from memory directly to registers and the store operation from registers directly to memory, functionally bypassing shared local memory, may allow hardware to execute with relatively high performance. In addition, no synchronization may be required since registers are used and/or since shared local memory is not needed. In one example, a gravity simulator (e.g., N-Body, 16384 Bodies) using fully a SIMT implementation which utilizes shared local memory may obtain approximately 64 GFlops, whereas the gravity simulator using SIMD block operations (e.g., reads and writes together with shuffles) may obtain 74 GFlops (or approximately a 16% improvement). In another example, a matrix multiplication (e.g., SGEMM, 1K X 1K Matrix) using a fully SIMT implementation which utilizes shared local memory may obtain approximately 65 GFlops, whereas the matrix multiplication using SIMD block operations (e.g., reads and writes together with shuffles) may obtain 74 GFlops (or approximately a 14% improvement).

The illustrated processing block 318 provides for implementing a block operation on a data block, wherein the block operation includes a data transfer event involving system memory performed by the element block using one memory address for the element block. For example, a SIMD module may include an instruction to cause an element block to perform a block load operation such as, for example, a load of the data block by the element block from memory (e.g., system memory) to a location other than shared local memory (e.g., a data register, a 2D image, etc.). In addition, the SIMD module may include an instruction to cause an element block to perform a block store operation such as, for example, a store of the data block by the element block from a location other than shared local memory (e.g., a data register, etc.) to memory (e.g., system memory). The block operation may use one memory buffer address for the entire element block (and/or data block) rather than individual memory addresses for each execution element of the element block to load from and/or store to a memory buffer (e.g., system memory). In addition, the block operation may use a one memory coordinate address for the entire element block (and/or data block) to load from and/or store to an image.

Figure 4:
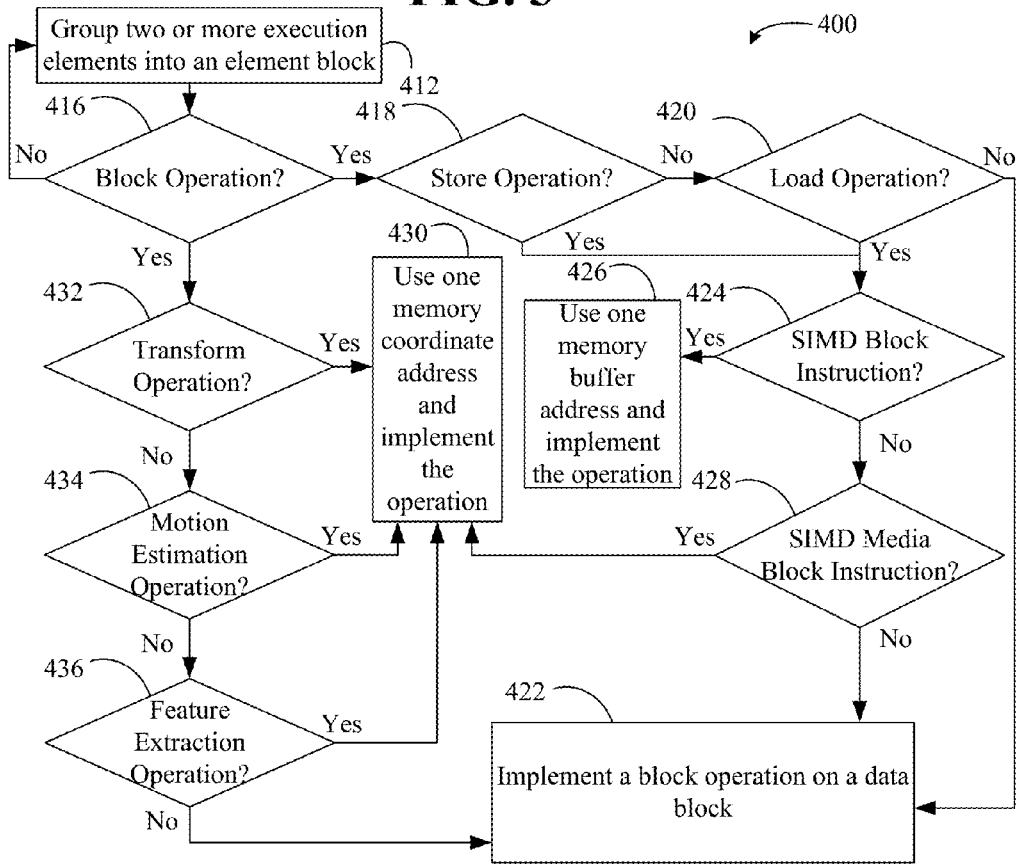
FIG. 4 is a flowchart of an example of a method of implementing a block operation according to an embodiment.

Turning now to FIG. 4, a method 400 provides for implementing a block operation according to an embodiment. The method 400 may be implemented using any of the herein mentioned technologies such as, for example, a set of logic instructions stored in a machine- or computer-readable storage medium. The illustrated processing block 412 may group two of more execution elements into an element block. A determination may be made at block 416 as to whether an operation involves a block operation. For example, the determination at the block 416 may indicate the operation is to be used for data-parallel processing, to process graphical data, to execute on hardware such as a graphical processing unit (GPU), and so on, or combinations thereof. If not, the method 400 may return to the processing block 412 and group further execution elements (e.g., if needed).

If the operation involves a block operation, a determination may be made at block 418 as to whether the block operation involves a store operation. If the block operation does not involve a store operation, a determination may be made at block 420 as to whether the block operation involves a load operation. If not, the illustrated processing block 422 implements a block operation on a data block. For example, the processing block 422 may examine whether the block operation involves another block operation such as, for example, a feature extraction operation and implement the feature extraction block operation. In one example, the block operation implemented by the processing block 422 includes a data transfer event involving system memory to be performed by the element block independently of shared local memory. In another example, the block operation implemented by the processing block 422 includes a data transfer event involving system memory to be performed by the element block using one memory address (e.g., memory buffer address, memory coordinate address, etc.) for the element block.

If it is determined at the block 418 that the block operation includes a store operation and/or if it is determined at the block 420 that the block operation includes a load operation, a determination may be made at block 424 as to whether a single instruction multiple data (SIMD) block instruction is to be implemented. For example, a SIMD block instruction may be implemented when writing to and/or reading from a memory buffer (e.g., system memory). If so, the processing block 426 uses one memory buffer address and implements the block operation according to the SIMD block instruction. For example, the processing block 426 may load a data block from the system memory using the one memory buffer address directly to a data register.

If an SIMD block instruction is not to be implemented, a determination may be made at block 428 as to whether a SIMD media block instruction is to be implemented. For example, an SIMD media block instruction may be implemented when writing to and/or reading from an image (e.g., 2D image), which may reside in memory such as, for example, system memory. If not, the method 400 may proceed to the processing block 422 to implement the block operation on the data block. If so, the processing block 430 uses one memory coordinate address and implements the block operation according to the SIMD media block instruction. For example, the processing block 428 may load a data block from the 2D image using the one memory coordinate address directly to a data register.

Additionally, a determination may be made at block 432 as to whether the block operation includes a transform operation when the block 416 determines that the operation involves a block operation. If it is determined at the block 432 that the block operation includes a transform operation, the processing element uses one memory coordinate address and implements the block operation. For example, the processing block 428 may convolve a data block from a 2D image using the one memory coordinate address and provide a modified block of data directly to a data register. In one example, the processing block 423 may also apply a filter weight for a convolve operation to generate the modified block of data from the data block.

If the block operation does not include a transform operation, a determination may be made at block 434 as to whether the block operation includes a motion estimation operation. If it is determined at the block 434 that the block operation includes a motion estimation operation, the processing block 434 uses one memory coordinate address and implements the block operation. For example, the processing block 424 may determine a motion vector from the data block for the motion estimation operation using one memory coordinate address and provide motion vector directly to a data register. In one example, the processing block 424 may replicate the result across the entire register for each execution element or may provide the motion vector to one location in the register, which may be accessible to each execution element in an element block.

If the block operation does not include a motion estimation operation, a determination may be made at block 436 as to whether the block operation includes a feature extraction operation. If it is determined at the block 436 that the block operation includes a feature extraction operation, the processing block 434 uses one memory coordinate address and implements the block operation. For example, the processing block 424 may determine a feature of interest using the one memory coordinate address and provide the feature directly to a data register. If it is determined at the block 432 that the block operation does not include a transform operation, that the block operation does not include a motion estimation operation at the block 434, and/or that the block operation does not include a feature extraction operation at the block 436, the method 400 may proceed to the processing block 422 to implement any other block operation on the data block. It should be understood that the type of block operation may be determined in any order, simultaneously or sequentially. For example, the respective determinations made at the blocks 418, 432 may be made simultaneously.

Figure 5:
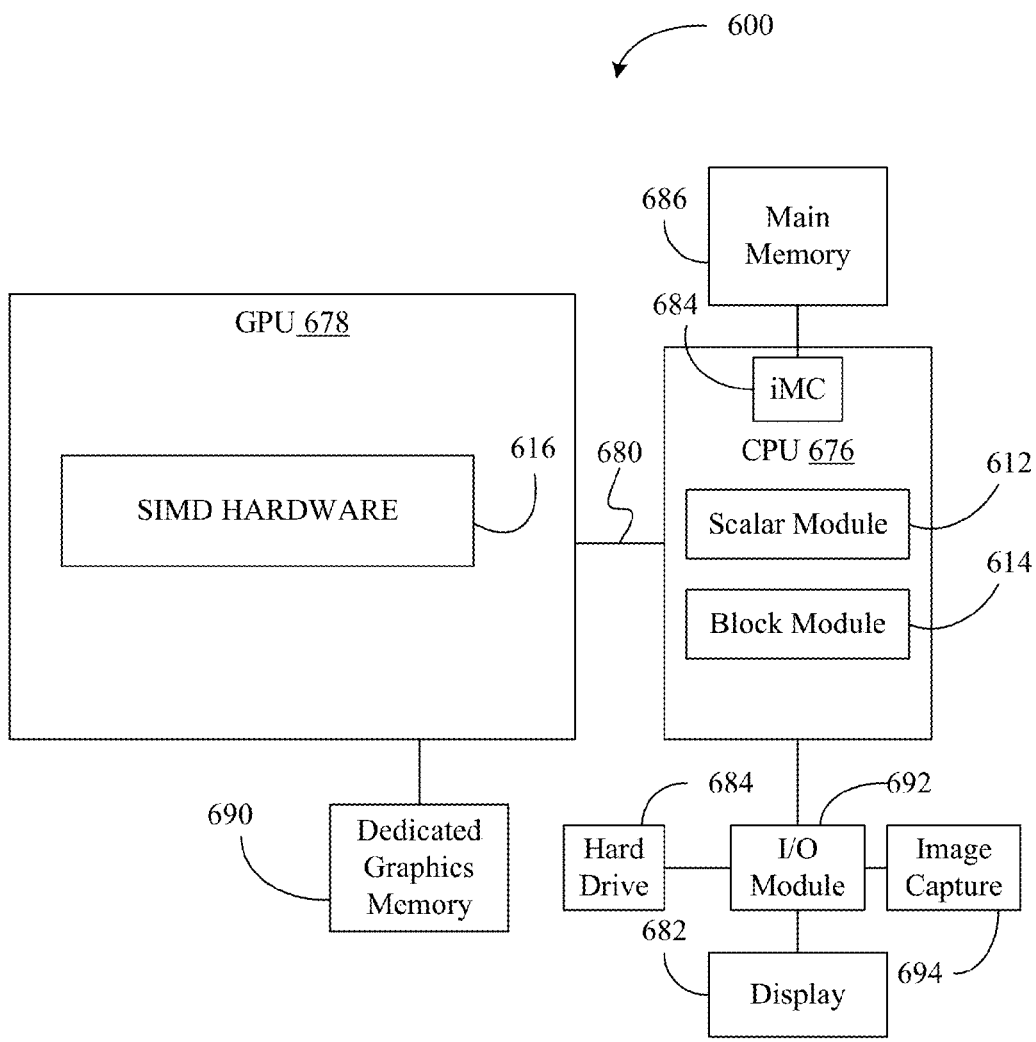
FIG. 5 is a block diagram of an example of a block operation computing system according to an embodiment.

Turning now to FIG. 5, a block operation computing system 600 is shown according to an embodiment. The computing system 600 may be part of a mobile platform such as a laptop, PDA, wireless smart phone, media player, imaging device, MID, gaming console, wearable computer, any smart device such as a smart phone, smart tablet and so on, or any combination thereof. The computing system 600 may also be part of a fixed platform such as a personal computer (PC), smart TV, server, workstation, etc. The illustrated computing system 600 includes one or more CPUs (central processing units) 676, a display device 682, a hard disk drive 684 and main memory 686, which could include, for example, DDR modules. The modules of the system memory 686 may be incorporated into a SIMM, DIMM, SODIMM, and so on.

The computing system 600 may include a graphics bus (e.g., slot) 680, wherein a graphics card (not shown) containing a graphics processing unit (GPU) 678 and dedicated graphics memory 690 could be coupled (e.g., plugged into) to the graphics bus 680. For example, the graphics bus 680 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification, September 2002) bus, and so on. The CPUs 676 may have an integrated memory controller (iMC) 684, and one or more processor cores (not shown) to execute one or more drivers associated with a host OS (operating system) and/or application software, wherein each core may be fully functional with instruction fetch units, instruction decoders, level one (L1) cache, execution units, and so on. The CPUs 676 could alternatively communicate with an off-chip variation of the iMC 684, also known as a Northbridge, via a front side bus. The illustrated CPUs 676 communicate with an input/output (I/O) module 692, also known as a Southbridge, via a hub bus. The iMC 684/CPUs 676 and the I/O module 692 are sometimes referred to as a chipset, or may be implemented together as a system-on-chip (SoC) architecture.

The illustrated computing system 600 also includes a scalar module 612 to define a plurality of execution elements, wherein two or more of the execution elements are to be grouped into an element block. The illustrated scalar module 612 is implemented in the CPUs 676, although it may also be implemented in the GPU 678. The illustrated computing system 600 includes a block module 614 to implement a block operation on a data block. The illustrated block module 614 is implemented in the CPUs 676, although it may also be implemented in the GPUs 678. The CPUs 676 may function as, for example, a host to control the GPUs 678 for data-parallel processing operations. Thus, the GPUs 678 may include single instruction multiple data (SIMD) hardware 616 including, for example, one or more compute units (e.g., cores, SIMD units, etc.), shared local memory, data registers, and so on. In addition, the compute units may correspond to execution blocks having two or more execution elements to execute functions.

The block module 614 may implement a block operation such as, for example, a load operation, a store operation, a transform operation, a motion estimation operation, a feature extraction operation, and so on, or combinations thereof. The block module 614 may implement a block operation on a data block, wherein the block operation may include a data transfer event involving system memory such as, for example, the main memory 686, the dedicated graphics memory 690, and so on, the hard drive 684, etc., or combinations thereof. In one example, the data transfer event may be performed by the element block independently of shared local memory (e.g., memory shared by the execution elements of an element block during a load and/or store operation) such as, for example, shared local memory in the SIMD hardware 616 when the system memory includes the main memory 686, the dedicated graphics memory 690, and so on.

Additionally, the block module 614 may implement a block operation on a data block, wherein the block operation may include a data transfer event involving system memory using one memory address for the element block. For example, the block module 614 may cause execution elements to use one memory buffer address, one memory coordinate address, and so on. Moreover, the block module 614 may implement a block operation on a data block, wherein the block operation may include a data transfer event including a data register and excluding shared local memory. For example, the block operation may be performed by, for example, directly writing to and/or reading from the data register of the SIMD hardware 616 and/or by bypassing the shared local memory of the SIMD hardware 616 during the block operation.

Figure 6:
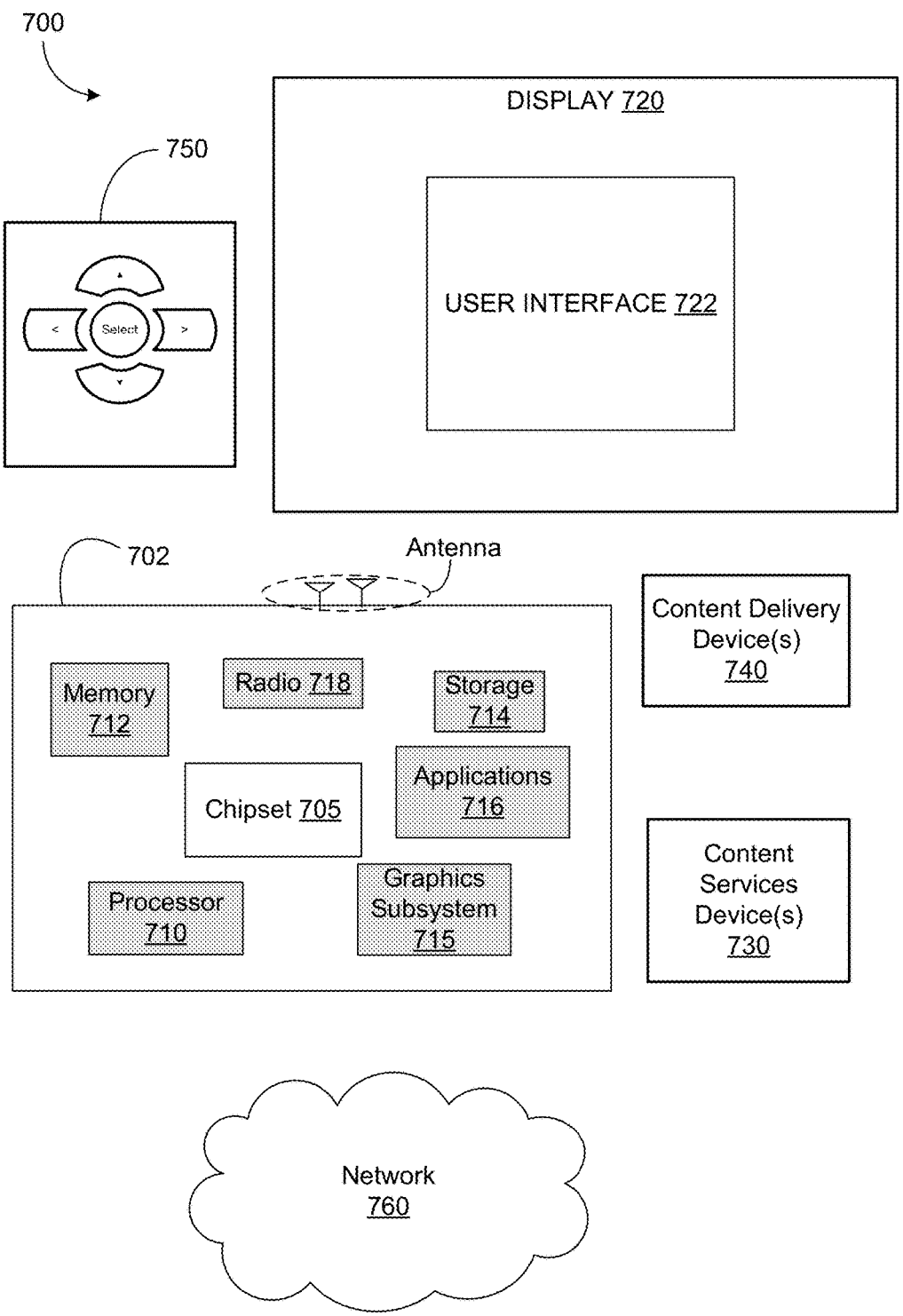
FIG. 6 is a block diagram of an example of a system including a block module according to an embodiment.

FIG. 6 illustrates an embodiment of a system 700 that may implement block operation logic according to an embodiment. The logic may include the scalar module 612, the block module 614, and/or the SIMD hardware 616 (FIG. 5), previously discussed. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, gaming console, and so on.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
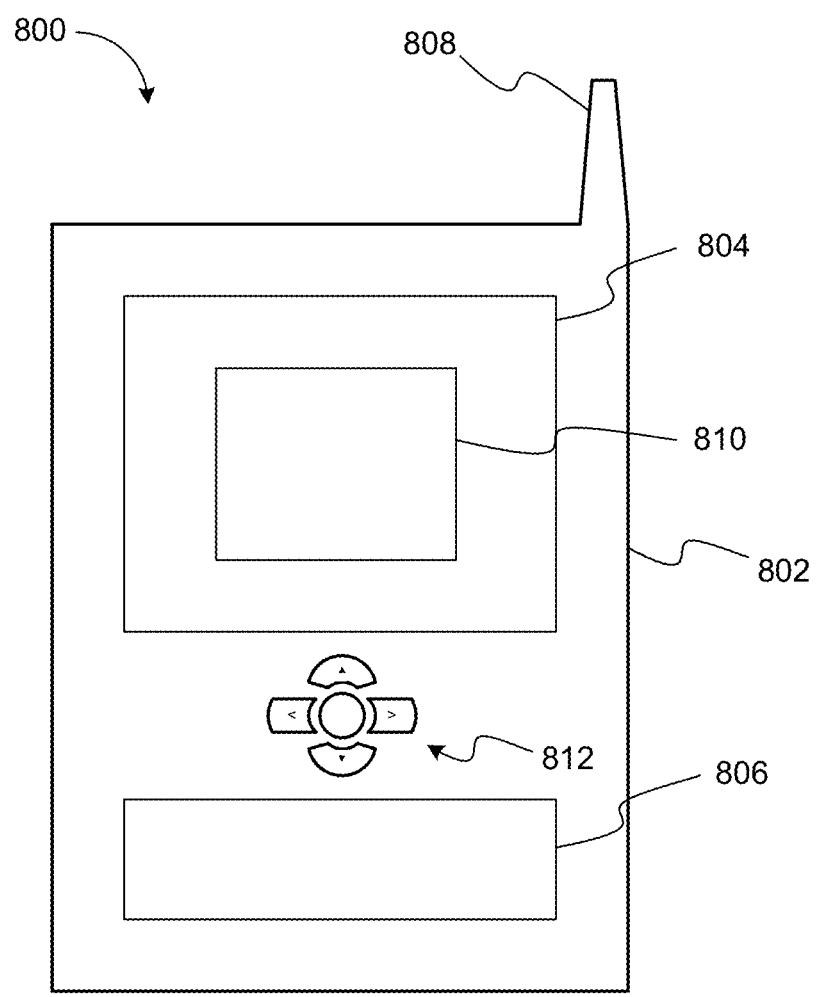
FIG. 7 is a block diagram of an example of a system having a small form factor according to an embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Examples may include subject matter such as a method, means for performing acts of the method, at least one machine-readable medium including instructions that, when performed by a machine cause the machine to performs acts of the method, or an apparatus or system to provide a block operation according to embodiments and examples described herein.

Example 1 may include an apparatus having a display. The apparatus may include a scalar module to define a plurality of execution elements, wherein two or more of the execution elements are to be grouped into an element block. The apparatus may include a block module to be invoked by the scalar module and implement a block operation on a data block, wherein the block operation is to include a data transfer event involving system memory to be performed by the element block independently of shared local memory. In addition, the display may render data based on the block operation.

Example 2 may include the subject matter of Example 1 and further optionally may include the block operation to include a data transfer event involving system memory to be performed by the element block using one memory address.

Example 3 may include the subject matter of any of Example 1 to Example 2 and further optionally may include the block operation to include one or more of a load operation, a store operation, a transform operation, a motion estimation operation, and a feature extraction operation.

Example 4 may include the subject matter of any of Example 1 to Example 3 and further optionally may include a data register, wherein the block operation is to include a data transfer event including the data register and excluding shared local memory to be performed by the element block.

Example 5 may include the subject matter of any of Example 1 to Example 4 and further optionally may include the load operation to include a load of the data block by the element block from the system memory directly to the data register, and the store operation to include a store of the data block by the element block from the data register directly to the system memory.

Example 6 may include the subject matter of any of Example 1 to Example 5 and further optionally may include the load operation to include a load of the data block by the element block from an image in the system memory directly to the data register, and the store operation to include a store by the element block of the data block from the data register directly to the image in the system memory.

Example 7 may include the subject matter of any of Example 1 to Example 6 and further optionally may include the element block to apply a filter weight for a convolve operation to generate modified data from the data block.

Example 8 may include the subject matter of any of Example 1 to Example 7 and further optionally may include the element block to determine a motion vector from the data block for the motion estimation operation, wherein the motion vector is to be replicated across the entire register for each execution element or is to reside at one location in the register and is to be accessible to each execution element.

Example 9 may include the subject matter of any of Example 1 to Example 8 and further optionally may include the width of the data block to be implicitly defined based on the number of elements in the element block.

Example 10 may include the subject matter of any of Example 1 to Example 9 and further optionally may include the block operation to include a data transfer event involving two or more rows of data.

Example 11 may include a computer readable storage medium comprising a set of instructions which, if executed by a processor, cause a computer to define a plurality of execution elements, wherein two or more of the execution elements are to be grouped into an element block, and implement a block operation on a data block, wherein the block operation is to include a data transfer event involving system memory to be performed by the element block independently of shared local memory.

Example 12 may include the subject matter of Example 11 and further optionally may include the block operation to include a data transfer event involving system memory to be performed by the element block using one memory address for the element block.

Example 13 may include the subject matter of any of Example 11 to Example 12 and further optionally may include the block operation to include one or more of a load operation, a store operation, a transform operation, a motion estimation operation, and a feature extraction operation.

Example 14 may include the subject matter of any of Example 11 to Example 13 and further optionally may include a data transfer event including a data register and excluding shared local memory to be performed by the element block.

Example 15 may include the subject matter of any of Example 11 to Example 14 and further optionally may include the load operation to include a load of the data block by the element block from the system memory directly to the data register, and the store operation to include a store of the data block by the element block from the data register directly to the system memory.

Example 16 may include the subject matter of any of Example 11 to Example 15 and further optionally may include the load operation to include a load of the data block by the element block from an image in the system memory directly to the data register, and the store operation to include a store by the element block of the data block from the data register directly to the image in the system memory.

Example 17 may include the subject matter of any of Example 11 to Example 16 and further optionally may include the element block to apply a filter weight for a convolve operation to generate modified data from the data block.

Example 18 may include the subject matter of any of Example 11 to Example 17 and further optionally may include the element block to determine a motion vector from the data block for the motion estimation operation, wherein the motion vector is to be replicated across the entire register for each execution element or is to reside at one location in the register and is to be accessible to each execution element.

Example 19 may include the subject matter of any of Example 11 to Example 18 and further optionally may include the width of the data block to be implicitly defined based on the number of elements in the element block or the block operation to include a data transfer event involving two or more rows of data.

Example 20 may include method to provide a block operation, comprising defining a plurality of execution elements, wherein two or more of the execution elements are grouped into an element block, and implementing a block operation on a data block, wherein the block operation includes a data transfer event involving system memory performed by the element block independently of shared local memory.

Example 21 may include the subject matter of Example 20 and further optionally may include the block operation including a data transfer event involving system memory performed by the element block using one memory address for the element block.

Example 22 may include the subject matter of any of Example 20 to Example 21 and further optionally may include the block operation including one or more of a load operation, a store operation, a transform operation, a motion estimation operation, and a feature extraction operation.

Example 23 may include the subject matter of any of Example 20 to Example 22 and further optionally may include the block operation including a data transfer event including a data register and excluding shared local memory performed by the element block.

Example 24 may include the subject matter of any of Example 20 to Example 23 and further optionally may include the load operation including a load of the data block by the element block from the system memory directly to the data register and the store operation including a store of the data block by the element block from the data register directly to the system memory, the load operation including a load of the data block by the element block from an image in the system memory directly to the data register and the store operation including a store by the element block of the data block from the data register directly to the image in the system memory, the element block applying a filter weight for a convolve operation to generate modified data from the data block, or the element block determining a motion vector from the data block for the motion estimation operation, wherein the motion vector is replicated across the entire register for each execution element or resides at one location in the register and is accessible to each execution element.

Example 25 may include the subject matter of any of Example 20 to Example 24 and further optionally may include the width of the data block is implicitly defined based on the number of elements in the element block or the block operation includes a data transfer event involving two or more rows of data.

Example 26 is at least one computer-readable medium including one or more instructions that when executed on one or more computing devices causes the one or more computing devices to perform the method of any of Example 20 to Example 25.

Example 27 is an apparatus including means for performing the method of any of Example 20 to Example 25.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carries the meaning of "one or more" or "at least one".

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. An apparatus comprising:
a display;
a shared local memory;
a data register; and
a processor configured to execute:
a scalar module to define a plurality of execution elements, wherein two or more of the execution elements are to be grouped into an element block; and
a block module to be invoked by the scalar module and implement a block operation on a data block, wherein the block operation is to include a data transfer event between system memory and the data register excluding the shared local memory to be performed by the two or more execution elements of the element block simultaneously by an access to one memory address in the system memory for the entire data block that does not explicitly define a width of the data block, wherein the width of the data block is to be implicitly defined based on the number of execution elements in the element block, and wherein the display is to render data based on the block operation.

2. The apparatus of claim 1, wherein the block operation is to include one or more of a load operation, a store operation, a transform operation, a motion estimation operation, and a feature extraction operation.

3. The apparatus of claim 2, wherein the load operation is to include a load of the data block by the two or more execution elements of the element block in parallel from the system memory directly to the data register, and the store operation is to include a store of the data block by the two or more execution elements of the element block in parallel from the data register directly to the system memory.

4. The apparatus of claim 2, wherein the load operation is to include a load of the data block by the two or more execution elements of the element block in parallel from an image in the system memory directly to the data register, and the store operation is to include a store of the data block by the two or more execution elements of the element block in parallel from the data register directly to the image in the system memory.

5. The apparatus of claim 2, wherein the two or more execution elements of the element block are to apply a filter weight in parallel to the data block of an image in the system memory for a convolve operation to generate modified data from the data block, wherein the modified data is to be loaded to the register to be shared by the two or more execution elements of the element block.

6. The apparatus of claim 2, wherein the two or more execution elements of the element block are to determine a motion vector in parallel from the data block for the motion estimation operation, and wherein the motion vector is to be replicated across the entire register for each execution element or is to reside at one location in the register and is to be accessible to each execution element.

7. The apparatus of claim 1, wherein the block operation is to include a data transfer event involving two or more rows of data operated on at the same time.

8. The apparatus of claim 1, wherein the source and the destination of the data block involved in the data transfer event between the system memory and the data register to be performed by the two or more execution elements of the element block in parallel is to be implicitly defined by utilization of the data register.

9. The apparatus of claim 1, wherein the data register is to include a hardware data register, the scalar module is to include a single instruction multiple thread module, and the block module is to include a single instruction multiple data module.

10. The apparatus of claim 1, wherein the block operation is to include a data transfer event between the system memory and the data register to be performed by the two or more execution elements of the element block simultaneously without synchronization.

11. A non-transitory computer readable storage medium comprising a set of instructions which, if executed by a processor, cause a computer to:
define a plurality of execution elements, wherein two or more of the execution elements are to be grouped into an element block; and
implement a block operation on a data block, wherein the block operation is to include a data transfer event between system memory and a data register to be performed by the two or more execution elements of the element block simultaneously by an access to one memory address in the system memory for the entire data block that does not explicitly define a width of the data block, and wherein the width of the data block is to be implicitly defined based on the number of execution elements in the element block.

12. The medium of claim 11, wherein the block operation is to include one or more of a load operation, a store operation, a transform operation, a motion estimation operation, and a feature extraction operation.

13. The medium of claim 12, wherein the load operation is to include a load of the data block by the two or more execution elements of the element block in parallel from the system memory directly to the data register, and the store operation is to include a store of the data block by the two or more execution elements of the element block in parallel from the data register directly to the system memory.

14. The medium of claim 12, wherein the load operation is to include a load of the data block by the two or more execution elements of the element block in parallel from an image in the system memory directly to the data register, and the store operation is to include a store of the data block by the two or more execution elements of the element block in parallel from the data register directly to the image in the system memory.

15. The medium of claim 12, wherein the two or more execution elements of the element block are to apply a filter weight in parallel to the data block of an image in the system memory for a convolve operation to generate modified data from the data block, wherein the modified data is to be loaded to the register to be shared by the two or more execution elements of the element block.

16. The medium of claim 12, wherein the two or more execution elements of the element block are to determine a motion vector in parallel from the data block for the motion estimation operation, and wherein the motion vector is to be replicated across the entire register for each execution element or is to reside at one location in the register and is to be accessible to each execution element.

17. The medium of claim 11, wherein
the block operation is to include a data transfer event involving two or more rows of data operated on at the same time.

18. A method comprising:
defining a plurality of execution elements, wherein two or more of the execution elements are grouped into an element block; and
implementing a block operation on a data block, wherein the block operation includes a data transfer event between system memory and a data register performed by the two or more execution elements of the element block simultaneously by accessing to one memory address in the system memory for the entire data block that does not explicitly define a width of the data block, and wherein the width of the data block is implicitly defined based on the number of execution elements in the element block.

19. The method of claim 18, wherein the block operation includes one or more of a load operation, a store operation, a transform operation, a motion estimation operation, and a feature extraction operation.

20. The method of claim 19, wherein:
the load operation includes a load of the data block by the two or more execution elements of the element block in parallel from the system memory directly to the data register, and the store operation includes a store of the data block by the two or more execution elements of the element block in parallel from the data register directly to the system memory;
the load operation includes a load of the data block by the two or more execution elements of the element block in parallel from an image in the system memory directly to the data register, and the store operation includes a store of the data block by the two or more execution elements of the element block in parallel from the data register directly to the image in the system memory;
the two or more execution elements of the element block apply a filter weight in parallel to the data block of the image in the system memory for a convolve operation to generate modified data from the data block, wherein the modified data is to be loaded to the register to be shared by the two or more execution elements of the element block; or
the two or more execution elements of the element block determine a motion vector in parallel from the data block for the motion estimation operation, wherein the motion vector is replicated across the entire register for each execution element or resides at one location in the register and is accessible to each execution element.

21. The method of claim 18, wherein
the block operation includes a data transfer event involving two or more rows of data operated on at the same time.

* * * * *